United States Patent [19]

Haaf

[11] 4,189,411

[45] Feb. 19, 1980

[54] MODIFIED POLYPHENYLENE ETHER COMPOSITIONS HAVING LOWER MELT VISCOSITIES

[75] Inventor: William R. Haaf, Voorhesville, N.Y.

[73] Assignee: General Electric Company, Pittsfield, Mass.

[21] Appl. No.: 870,729

[22] Filed: Jan. 19, 1978

[51] Int. Cl.$^2$ ............................................. C08L 93/00
[52] U.S. Cl. ................................. 260/27 R; 260/4 R; 260/4 AR; 260/27 BB; 264/331; 525/50; 525/132
[58] Field of Search ............ 260/876 R, 27 R, 27 BB, 260/874, 823, 892, 893, 876 B, 897 R, 4 R, 4 AR, 858, 859 R

[56] References Cited

U.S. PATENT DOCUMENTS

| | | | |
|---|---|---|---|
| 3,383,435 | 5/1968 | Cizek | 260/874 |
| 3,663,661 | 5/1972 | Katchman | 260/876 R |
| 3,792,122 | 2/1974 | Fromuth, Jr. | 260/874 |
| 3,833,687 | 9/1974 | Lee, Jr. | 260/876 R |
| 3,835,200 | 9/1974 | Lee, Jr. | 260/880 R |
| 3,887,646 | 6/1975 | Yonemitsu et al. | 260/873 |
| 3,887,647 | 6/1975 | Yonemitsu et al. | 260/873 |
| 4,020,124 | 4/1977 | Abolins et al. | 260/876 R |

FOREIGN PATENT DOCUMENTS 1344729  1/1974  United Kingdom .

*Primary Examiner*—Melvyn I. Marquis
*Attorney, Agent, or Firm*—Morgan, Finnegan, Pine, Foley & Lee

[57] ABSTRACT

There are provided new thermoplastic compositions useful in the preparation of shaped articles, the compositions comprising, in admixture, a polyphenylene ether resin, a styrene resin and as a modifier therefor, a resinous material having a softening point above the heat distortion temperature of the total composition, the resinous material being present in an amount at least sufficient to lower the melt viscosity of the composition while molten with retention of the heat deflection temperature of the composition after molding.

1 Claim, No Drawings

MODIFIED POLYPHENYLENE ETHER COMPOSITIONS HAVING LOWER MELT VISCOSITIES

This invention relates to compositions comprising a polyphenylene ether resin and a styrene resin which have been modified to lower the melt viscosity for greater ease in processing, without any significant losses in other desirable physical properties. More particularly, it has been found that if a resinous material having a softening point above the heat distortion temperature of the final composition is added to a combination of a polyphenylene ether resin and a styrene resin, the melt viscosity of the polyphenylene ether resin-styrene resin composite is lowered without adversely affecting the thermal resistance of the composite after molding.

BACKGROUND OF THE INVENTION

The term "polyphenylene ether resin" is well known in the art as defining a class of thermoplastic polymers which possess a number of outstanding properties. They are useful for many conventional applications requiring high temperature resistance, including the formation of film, fiber and molded articles. Methods of their preparation are disclosed, for example, in Hay, U.S. Pat. Nos. 3,306,874 and 3,306,875 and in Stamatoff, U.S. Pat. Nos. 3,257,357 and 3,257,358, which are incorporated herein by reference.

It is known that when a polyphenylene ether resin is combined with a styrene resin, the resulting composition provides properties which are better than those of either resin alone. See, e.g., Cizek, U.S. Pat. No. 3,383,435, the disclosure of which is incorporated herein by reference.

The polyphenylene ether resins and composites of a polyphenylene ether resin and a styrene resin are characterized by their normally high heat deflection temperature, as well as their high melt viscosities. The property heat deflection temperature, also known in the art as the "heat distortion temperature," is a measure of the ability of a test specimen of given dimensions to resist deformation under load at elevated temperatures. High heat deflection temperatures are generally desirable in articles molded from thermoplastic compositions. On the other hand, a high melt viscosity in the molten resin often makes processing more difficult and is therefore undesirable in many molding applications.

Previous efforts have been made to improve the melt flow by reducing the melt viscosity of polyphenylene ether resin alone and in combination with styrene resins. Improvements in the melt flow have usually been at the cost of significant reductions in the heat deflection temperature and other desirable properties, however. For instance, it is disclosed in British Pat. No. 1,344,729 that the melt viscosity of a polyphenylene ether resin is lowered by the addition of certain high melting hydrocarbon resins derived from coal-tar naphthas, e.g., styrene resins, coumarone resins, indene resins, cyclopentadiene resins, and others. The patentees state that these compositions are also characterized by reduced heat distortion temperatures, i.e., heat deflection temperature, in almost direct proportion to the amount of the high melting hydrocarbon resin present (page 3, first column, lines 11–15).

It has now been discovered that when certain high softening point resinous materials are added to compositions comprising a polyphenylene ether resin in admixture with a styrene resin, the melt flow is improved without any appreciable loss in the heat deflection temperature level in the composition after molding, and without sacrificing other desirable physical properties to any significant extent. This discovery is surprising in view of the teachings in the aforementioned British patent to the effect that the heat deflection temperature of a polyphenylene ether resin alone undergoes a significant decrease when certain high melting resins are added. Moreover, the high softening point resinous additives of this invention are brittle, low molecular weight substances which are generally regarded as being suitable only in non-load-bearing applications, such as printing inks, pigment wetting, tackifiers, adhesives, and the like, and their effectiveness in reducing the melt viscosity without decreasing the heat deflection temperature in this invention is all the more unexpected.

DESCRIPTION OF THE INVENTION

The present invention provides, in its broadest aspects, thermoplastic molding compositions comprising, in admixture:

(a) a polyphenylene ether resin in intimate admixture with a styrene resin, and (b) a resinous material having a softening point above the heat distortion temperature of the total composition, the resinous material being present in an amount at least sufficient to lower the melt viscosity of (a) while molten with retention of the heat deflection temperature level in the composition after molding.

In general, component (b) is present in amounts of at least about 1%, more preferably from about 3 to about 15% by weight of (a) and (b) combined.

The polyphenylene ether resin is preferably of the type having the formula:

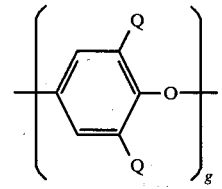

where the oxygen ether atom of one unit is connected to the benzene nucleus of the next adjoining unit, q is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus.

In preferred embodiments, each Q is alkyl and more preferably, alkyl having from 1 to 4 carbon atoms. Examples include poly(2,6-dimethyl-1,4-phenylene)ether; poly(2,6-diethyl-1,4-phenylene)ether; poly(2-methyl-6-ethyl-1,4-phenylene)ether; poly(2-methyl-6-propyl-1,4-phenylene)ether; poly(2,6-dipropyl-1,4-phenylene)ether; poly(2-ethyl-6-propyl-1,4-phenylene)ether; and the like.

Especially preferably the polyphenylene ether resin is poly(2,6-dimethyl-1,4-phenylene)ether.

The polyphenylene ether resin can be prepared by methods which are well known in the art, e.g., by the oxidative coupling of a phenol in the presence of a metal salt-amine complex catalyst, as disclosed in the Hay patents, or by the oxidation of phenolate ions in the presence of free radical initiators, as disclosed in the Stamatoff patents, above-mentioned.

The preferred styrene resins will be those having at least 25% by weight of repeating units derived from a vinyl aromatic compound of the formula:

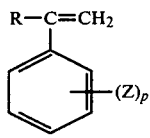

wherein R is hydrogen, (lower)alkyl or halogen; Z is vinyl, hydrogen, halogen or (lower)alkyl; and P is 0 or an integer of from 1 to 5. Herein, the term "(lower)alkyl" means alkyl of from 1 to 6 carbon atoms.

The term "styrene resin" as used herein includes homopolymers, such as polystyrene and polychlorostyrene, as well as styrene polymers which have been modified by admixture or interpolymerization with natural or synthetic elastomeric materials, e.g., polybutadiene, polyisoprene, butyl rubber, EPDM rubber, ethylene-propylene copolymers, natural rubber, polysulfide rubbers, polyurethane rubbers, epichlorohydrin, styrene containing copolymers such as the styrene-acrylonitrile copolymers (SAN), styrene-butadiene copolymers, styrene-maleic anhydride copolymers, styrene-acrylonitrile-butadiene terpolymers (ABS), poly-α-methyl-styrene, copolymers of ethylvinylbenzene and divinylbenzene, block copolymers of the A-B-A and A-B types where A is polystyrene and B is an elastomeric polymerized diene, e.g., polybutadiene or polyisoprene, as well as graft and radial block copolymers of polystyrene and polybutadiene, and acrylic resin modified styrene-butadiene resins.

Special mention is made of rubber modified polystyrene resins comprising a two-phase system in which rubber is dispersed in a polystyrene matrix in the form of discrete particles. The particles can be formed by a mechanical blending of the rubber and the polystyrene resin and, in this case, the particles will comprise a dispersed ungelled elastomeric phase. On the other hand, the two-phase system can consist of interpolymers of a styrene monomer and an elastomer or rubber, usually prepared commercially by the grafting of rubber in the presence of polymerizing styrene. Such systems consist of a continuous phase of the polymerized styrene monomer in which the rubber or elastomer is dispersed in a discontinuous gel phase, with or without grafted chains of polymerized styrene monomer.

Methods of preparation are described in the patent literature, e.g., Wallren et al, U.K. Pat. No. 1,174,214 and elsewhere, e.g., Bender, J. Appl. Polymer Science, 9, 2887 (1965), which are incorporated herein by reference.

The polyphenylene ether resins and the styrene resins are combinable in all proportions.

Component (b) is selected from among a wide range of resinous materials, it being necessary only that the softening point of the selected material is higher than the heat distortion temperature of the overall composition. Within this limitation, component (b), illustratively, can be chosen from among petroleum-derived low molecular weight aliphatic, alicyclic and aromatic resins, i.e., produced from unsaturated monomers obtained from petroleum cracking, including olefins, e.g., pentenes, hexenes, heptenes and the like; diolefins, e.g., pentadienes, hexadienes and the like; cyclic olefins and diolefins, e.g., cyclopentene, cyclopentadiene, cyclohexene, cyclohexadienes, methyl cyclopentadiene and the like; cyclic diolefin dienes, e.g., dicyclopentadiene, methylcyclopentadiene dimer and the like; and aromatic hydrocarbons, e.g., vinyltoluenes, indene, methylindenes and the like. Also included are coumarone-indene resins.

These resins are commercially available or can be prepared by following procedures described in the literature, such as by the catalytic polymerization or copolymerization of the corresponding petroleum derived monomers or coal-tar fractions, using a strong acid, e.g., sulfuric, Friedel-Crafts type catalyst, or free radical intiators.

Component (b) can also be selected from among the polymerized products of pine wood rosin, or colophony, i.e., the thermoplastic resinous material isolated from naturally occurring constituents of pine trees. These include polymerized rosin and esters or modified esters of polymerized rosin, e.g., methyl esters, ethylene glycol esters, diethylene glycol esters, triethylene glycol esters, glycerol esters, maleic-modified or phenolic-modified glycerol esters, pentaerythritol esters, maleic-modified or phenolic-modified pentaerythritol esters, and the like.

The polyterpene resins are prepared commercially by the catalytic polymerization of terpene monomers such as α-pinene, β-pinene, β-phellandrene, dipentene, myrcene, and the like, using high-energy radiation, Ziegler catalysts, free radical initiators or cationic catalysts, in suitable alcoholic or aromatic solvents.

Other ingredients can also be included for their conventionally employed purposes, such as reinforcing agents and/or cost extenders, especially fibrous glass or fibrous glass-containing reinforcements, certain inorganic mineral fillers such as clay, talc, mica, calcium carbonate and wollastonite, flame retardants, drip retardants, stabilizers, antioxidants, pigments, coloring agents, processing aids, and the like.

The compositions of this invention are prepared by forming a blend premix of the ingredients, passing the blend through an extruder at a temperature of from about 500° to about 600° F., dependent on the needs of the particular composition, cooling the extrudate and molding it to any desired shape.

DESCRIPTION OF THE PREFERRED EMBODIMENTS

The compositions of this invention are illustrated in the following examples. These are not intended to limit the invention in any manner.

EXAMPLES 1-5

Compositions according to this invention are prepared by dispersing the ingredients in a Henschel mixer, passing the premix through a 28 mm Werner-Pfleiderer twin screw extruder at 580° F., and injection molding the cooled extrudate in a Newbury injection molding machine set at 600° F. cylinder temperature, 200° F. mold temperature. The molded compositions are evaluated for physical properties according to ASTM guidelines. The compositions and properties are summarized in Tables 1 and 2, respectively.

TABLE 1

Compositions Comprising a Polyphenylene Ether Resin, a Styrene Resin and a Melt Viscosity Modifying Resin

| Ingredients, parts by weight | Example 1 | 2 | 3 | 4 | 5 | A* |
|---|---|---|---|---|---|---|
| poly(2,6-dimethyl-1,4-phenylene)ether[a] | 70 | 70 | 70 | 70 | 70 | 70 |
| high impact, rubber modified polystyrene[b] | 30 | 30 | — | — | — | 30 |
| homopolystyrene[c] | — | — | 30 | 30 | 30 | — |
| styrene-hydrogenated polybutadiene-styrene block copolymer[d] | — | — | 10 | 10 | 10 | — |
| low molecular weight aliphatic resin[e] | 10 | — | — | 10 | — | — |
| phenolic-modified pentaerythritol ester of rosin[f] | — | 10 | — | — | 10 | — |
| aluminum silicate clay[g] | — | — | 10 | 10 | 10 | — |
| polyethylene | 1.5 | 1.5 | 1.5 | 1.5 | 1.5 | 1.5 |
| tridecyl phosphite | 0.5 | 0.5 | 0.5 | 0.5 | 0.5 | 0.5 |

*control experiment for Examples 1 and 2
[a] having an intrinsic viscosity of 0.39 deciliters per gram in solution in chloroform at 30° C.
[b] Foster Grant, Inc.'s No. 834 high impact polystyrene, having a dispersed elastomeric phase and a polybutadiene content of about 9% by weight
[c] KPTL-5, Arco Polymers, Inc., having a number average molecular weight of 41,600 as measured by GPC
[d] Kraton G 6521, Shell Chemical Co.
[e] PICCOVAR AB-180, Hercules Chemical Co., manufactured from mixed low molecular weight monomers and having a ring and ball softening point of 352° F., (ASTM E28-67)
[f] PENTALYN 833, Hercules Chemical Co., having a ring and ball softening point of 343° F., (ASTM E28-67)
[g] NCF clay, Freeport Kaolin Co.

TABLE 2

Physical Properties of Compositions Comprising a Polyphenylene Ether Resin, a Styrene Resin and a Melt Viscosity Modifying Resin

| Physical Properties | EXAMPLE 1 | 2 | 3 | 4 | 5 | A* |
|---|---|---|---|---|---|---|
| Heat Deflection Temp., °F.[h] | 294 | 292 | 312 | 303 | 303 | 293 |
| Melt Viscosity, poise[i] | 2,240 | 2,650 | 2,900 | 1,830 | 2,400 | 3,270 |
| Flow channel length, inches[j] | 28.0 | 26.0 | 26.5 | 37.5 | 31.0 | 24.0 |
| Notched Izod impact strength, ft.lbs./in.n. | 1.2 | 1.4 | 1.1 | 1.1 | 0.7 | 1.7 |
| Gardner impact strength, in.-lbs. | 35 | 90 | 165 | 230 | 175 | 60 |
| Flexural yield, psi | 16,000 | 16,700 | 16,200 | 14,400 | 15,900 | 16,900 |
| Flexural modulus, psi | 368,000 | 383,000 | 405,000 | 364,000 | 412,000 | 388,000 |
| Tensile elongation, % | 29 | 74 | 20 | 31 | 17 | 35 |
| Tensile strength at yield, psi | 11,300 | 11,400 | 12,000 | 10,900 | 11,700 | 11,800 |
| Tensile strength at break, psi | 8,100 | 9,000 | 9,600 | 9,000 | 8,900 | 9,200 |

*control experiment for Examples 1 and 2
[h] measured under 264 psi fiber stress using a 2½ inch × ⅛ inch × ⅛ inch test specimen
[i] measured at 540° F., 1500 sec⁻¹
[j] length of melt flow in a ¼ inch × ⅛ inch channel; molding conditions: 600° F. cylinder (set), 200° F. mold (set) and 10,000 psi injection pressure into mold It is shown that a dramatic decrease in the melt viscosity without any appreciable decrease in the heat deflection temperature is obtained with the compositions according to this invention, in comparison with the control formulation. The other physical properties are, for the most part, maintained at existing levels or, in any event, not adversely affected to any significant degree.

Other variations and modifications are possible in the light of the above disclosure. For instance, instead of a low molecular weight aliphatic resin or a phenolic-modified ester of rosin, other high softening point resinous materials can be used to lower the melt viscosity, such as petroleum-derived aromatic resins, polyindene resins, polystyrene resins, coumarone-indene resins, and the like. Instead of 70% by weight of a polyphenylene ether resin, lower, or higher amounts of this material may be used as desired. Other ingredients such as flame retardants, reinforcing agents, and the like can also be added.

It is to be understood, therefore, that changes may be made in the particular embodiments disclosed herein without departing from the scope of the invention as defined in the appended claims.

I claim:

1. A thermoplastic molding composition comprising, in admixture:
   (a) a polyphenylene ether resin in intimate admixture with a styrene resin, and
   (b) a phenolic-modified pentaerythritol ester of rosin having a softening point above the heat distortion temperature of the final composition, said ester being present in an amount at least sufficient to lower the melt viscosity of (a) while molten with retention of the heat deflection temperature level in the composition after molding.

* * * * *

UNITED STATES PATENT AND TRADEMARK OFFICE
CERTIFICATE OF CORRECTION

PATENT NO. : 4,189,411
DATED : February 19, 1980
INVENTOR(S) : William Robert Haaf It is certified that error appears in the above-identified patent and that said Letters Patent are hereby corrected as shown below:

In Col. 2, line 47, the structural formula should correctly read as follows:

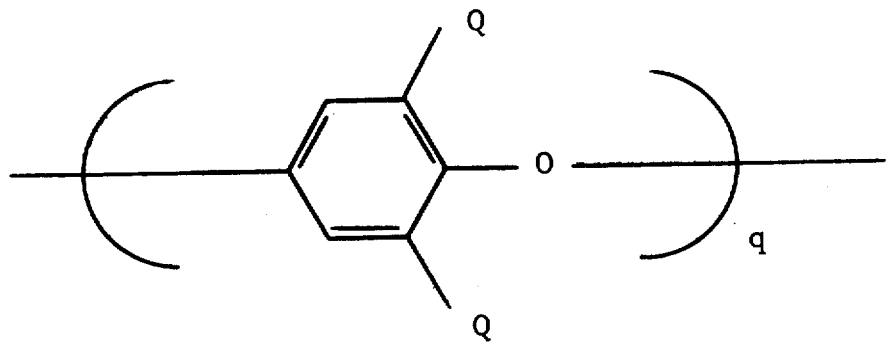

Signed and Sealed this

Tenth Day of June 1980

[SEAL]

Attest:

SIDNEY A. DIAMOND

Attesting Officer

Commissioner of Patents and Trademarks